United States Patent
Madden et al.

(10) Patent No.: US 12,288,428 B2
(45) Date of Patent: Apr. 29, 2025

(54) DETECTING USE OF DRIVER ASSISTANCE SYSTEMS

(71) Applicant: Cambridge Mobile Telematics Inc., Cambridge, MA (US)

(72) Inventors: Samuel Ross Madden, Newton, MA (US); William Francis Bradley, Arlington, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 220 days.

(21) Appl. No.: 17/825,208

(22) Filed: May 26, 2022

(65) Prior Publication Data
US 2023/0386269 A1 Nov. 30, 2023

(51) Int. Cl.
G07C 5/08 (2006.01)
G07C 5/00 (2006.01)

(52) U.S. Cl.
CPC ........... *G07C 5/0808* (2013.01); *G07C 5/008* (2013.01)

(58) Field of Classification Search
CPC .... G07C 5/0808; G07C 5/008; G07C 5/0816; G06Q 40/08; B60W 40/09; B60W 2540/229; B60W 40/08; G06V 20/597
See application file for complete search history.

(56) References Cited

U.S. PATENT DOCUMENTS

| | | | |
|---|---|---|---|
| 8,457,880 B1 | 6/2013 | Malalur et al. | |
| 10,185,999 B1 * | 1/2019 | Konrardy | G06Q 40/08 |
| 2015/0312655 A1 | 10/2015 | Balakrishnan et al. | |
| 2018/0047107 A1 | 2/2018 | Perl et al. | |
| 2020/0090426 A1 * | 3/2020 | Barnes | G07C 5/085 |
| 2021/0053579 A1 | 2/2021 | Gaudin et al. | |
| 2021/0394765 A1 | 12/2021 | Cordova et al. | |
| 2022/0084086 A1 * | 3/2022 | Silva | G01C 21/3697 |
| 2022/0301064 A1 * | 9/2022 | Kim | G06Q 40/04 |

OTHER PUBLICATIONS

Extended European Search Report in European Appln. No. 23175686.7, mailed on Sep. 21, 2023, 7 pages.

* cited by examiner

*Primary Examiner* — Bao Long T Nguyen
(74) *Attorney, Agent, or Firm* — Fish & Richardson P.C.

(57) ABSTRACT

A system can include a mobile device that includes one or more sensors for sensing information during a trip in a vehicle. A hardware processor can execute operations including receiving telematics information produced by one or more sensors during a trip in a vehicle; processing, by a hardware processor, the received telematics information to identify vehicle movement information for the vehicle during the trip; determining, by the hardware processor, a probability that an advanced driver assistance system (ADAS) feature of the vehicle was operational during the trip based, at least in part, on the vehicle movement information for the vehicle during the trip; and determining, by the hardware processor, a risk score for the vehicle or a driver of the vehicle based, at least in part, on the probability that the ADAS feature was operational.

22 Claims, 11 Drawing Sheets

DETECTING USE OF DRIVER ASSISTANCE SYSTEMS

BACKGROUND

Vehicles can include advanced driver-assistance systems (ADAS). ADAS are groups of electronic technologies that assist drivers in driving and parking functions. ADAS can use a variety of technologies to assist the driver. ADAS are developed to automate, adapt, and enhance vehicle technology for safer driving experiences. ADAS can include features such as automated lighting, adaptive cruise control, collision avoidance systems, satellite navigation and traffic warnings, obstacle identification, lane departure warning and lane centering, lane change assist, navigational assistance, and other features.

SUMMARY

Aspects of the embodiments include a computer-implemented method that includes receiving telematics information produced by one or more sensors during a trip in a vehicle; processing, by a hardware processor, the received telematics information to identify vehicle movement information for the vehicle during the trip; determining, by the hardware processor, a probability that an advanced driver assistance system (ADAS) feature of the vehicle was operational during the trip based, at least in part, on the vehicle movement information for the vehicle during the trip; and determining, by the hardware processor, a risk score for the vehicle or a driver of the vehicle based, at least in part, on the probability that the ADAS feature was operational.

Aspects of the embodiments include a system comprising a device comprising a plurality of sensors; a hardware processor to execute instructions; and a memory comprising non-transient computer-readable storage media storing instructions that, when executed, cause the hardware processor to execute operations. The operations include receiving telematics information produced by one or more sensors during a trip in a vehicle; processing, by a hardware processor, the received telematics information to identify vehicle movement information for the vehicle during the trip; determining, by the hardware processor, a probability that an advanced driver assistance system (ADAS) feature of the vehicle was operational during the trip based, at least in part, on the vehicle movement information for the vehicle during the trip; and determining, by the hardware processor, a risk score for the vehicle or a driver of the vehicle based, at least in part, on the probability that the ADAS feature was operational.

Aspects of the embodiments include non-transient computer-readable storage media storing instructions that, when executed, cause the hardware processor to execute operations. The operations include receiving telematics information produced by one or more sensors during a trip in a vehicle; processing, by a hardware processor, the received telematics information to identify vehicle movement information for the vehicle during the trip; determining, by the hardware processor, a probability that an advanced driver assistance system (ADAS) feature of the vehicle was operational during the trip based, at least in part, on the vehicle movement information for the vehicle during the trip; and determining, by the hardware processor, a risk score for the vehicle or a driver of the vehicle based, at least in part, on the probability that the ADAS feature was operational.

In some embodiments, processing the received telematics information comprises comparing the vehicle movement information against known benchmarks; and determining a probability that an ADAS feature of the vehicle is operational during the trip comprises determining that the comparison of the movement information against the known benchmarks indicates a probability that the ADAS features operational.

In some embodiments, the known benchmarks comprise values for one or more telematics information that correlate to observed telematics information when a corresponding ADAS of the vehicle is known to be operational.

Embodiments can also include defining a time window for sampling the vehicle movement information; grouping a first subset of vehicle movement information into a first cluster for the first time window, the first cluster comprising sampled values of the vehicle movement information comprising a first average value; grouping a second subset of vehicle movement information into a second cluster for the second time window, the second cluster comprising sampled values of the vehicle movement information comprising a second average value; determining a probability that an ADAS feature of the vehicle was operational during the first time window based on a comparison of the first cluster with the second cluster.

In some embodiments, the vehicle movement information comprises information about speed of the vehicle; and wherein determining that an ADAS of the vehicle is likely to be operational comprises determining that an adaptive cruise control of the vehicle is likely to be operational based on the information about the speed of the vehicle.

Some embodiments include calculating a variance in speed of the vehicle within a predetermined amount of time; determining that the variance in speed of the vehicle within the predetermined amount of time is below a threshold variance value S; and determining that the adaptive cruise control is likely to be operational based, at least in part, on a variance in speed of the vehicle during a predetermined time duration being below the threshold variance value S.

Some embodiments can include calculating a maximum speed of the vehicle within a predetermined window of time; calculating a minimum speed of the vehicle within the predetermined window of time; for a predetermined number of windows of time, determining a difference in the maximum speed for all windows and the minimum speed for all windows; determining that the difference between minimum speed and maximum speed for all windows is less than a threshold variance value D; determining a variance of the maximum speed for each window; and determining that the adaptive cruise control is likely to be operational based, at least in part, on a variance in maximum speed being below the threshold variance value D.

Some embodiments can include determining, from the speed information, that the vehicle accelerated A to a maximum speed in T seconds; and determining that the adaptive cruise control is likely to be operational based, at least in part, on A being greater than a threshold acceleration value and T being within a threshold time value.

Some embodiments can include determining that the vehicle made a turn; determining that the vehicle decelerated prior to the vehicle making the turn by less than a predetermined threshold time T; and determining that the adaptive cruise control is likely to be operational based at least in part on the vehicle decelerating prior to the vehicle making the turn by less than the predetermined threshold amount of time T.

In some embodiments, determining that the vehicle made a turn comprises determining that the vehicle made a turn based on one or more of a map matching of the road network, a global positioning system (GPS) position data, and gyroscopic sensor data.

In some embodiments, the telematics information comprises information about position of the vehicle from one or both of map matching and global position satellite (GPS) information; and the method further comprising determining that the adaptive cruise control of the vehicle is likely to be operational based on the information about the position of the vehicle.

Some embodiments can include determining, from one or more both of the map matching or GPS information that the vehicle was on a multi-lane road; and determining that the adaptive cruise control of the vehicle is likely to be operational based on the vehicle being on a large road.

In some embodiments, the telematics information comprises image information about a second vehicle that was in front of the vehicle; the method further comprising determining that the adaptive cruise control is likely to be operational based, at least in part, on the image information about the second vehicle.

Some embodiments include determining, from the image information, a relative distance for the second vehicle relative to the vehicle for a predetermined amount of time; determining, from the determined relative distance, that a variance of the relative distance between the second vehicle and the vehicle was below a threshold variance value for the predetermined amount of time; and determining that the adaptive cruise control is likely to be operational based, at least in part, on the variance of the relative distance between the second vehicle and the vehicle being below a threshold variance value.

Some embodiments include determining a driver of the vehicle based, at least in part on, identification information of an application running on a mobile device within the vehicle; identifying driving metrics of the driver; and using the driving metrics of the driver in the comparison of the telematics information against the benchmarks.

Some embodiments include using the driving metrics of the driver, at least in part, to determine the benchmarks.

Some embodiments include determining, from the application running on the mobile device, a make and model of the vehicle; and determining that the make and model of the vehicle includes the ADAS.

BRIEF DESCRIPTION OF THE DRAWINGS

Figures not drawn to scale. Like reference numbers refer to like components.

DETAILED DESCRIPTION

ADAS features can be activated or deactivated by the driver. For example, a driver may choose to switch off the lane departure warning system. Adaptive cruise control is typically off until a driver turns it on. It is not always clear, therefore, which ADAS features are active in a particular vehicle for a particular driver at any given moment in time.

ADAS features can affect the driving risk of the vehicle or a driver of the vehicle. Therefore, insurance providers have an interest in determining if a vehicle is actively using ADAS features, and how that ADAS decision affects risk. In many occasions, an ADAS operational state is not information that is exposed to mobile devices or to telematics applications running on mobile devices. This disclosure describes determining a probability of whether an ADAS feature was operating in the vehicle during a trip using vehicle telematics information and other information associated with the trip. The ADAS operational information can be communicated for the purposes of, for example, assessing risk.

The techniques described herein can use machine learning, such as neural networks, or other artificial intelligence to determine probabilistically whether an ADAS feature is operational. In some embodiments, supervised machine learning is used by training the algorithm(s) to, for example, differentiate between a human driver and an automation within the vehicle. The techniques described herein can also use predictive modeling techniques, physics-based modeling, statistical observation, benchmarks comparisons, clustering algorithms, or other analytical models.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Figure 1:
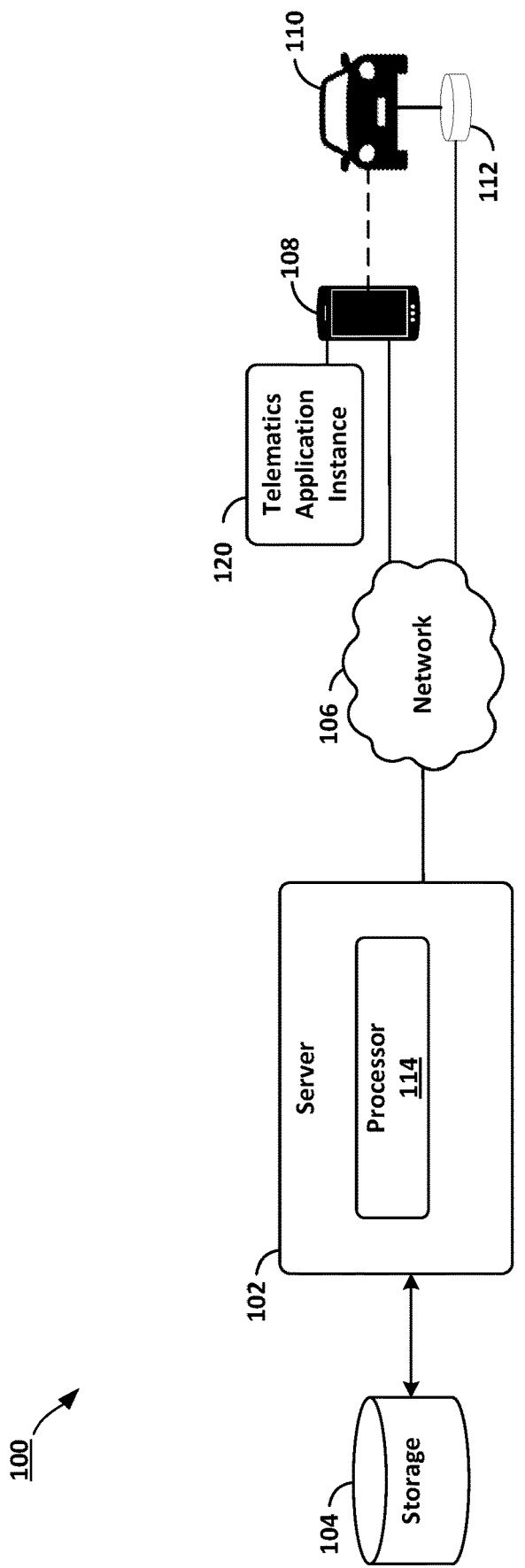
FIG. 1 is a schematic diagram illustrating an example system for determining whether one or more advanced driver assistant system (ADAS) features are operational in a vehicle during a trip in accordance with embodiments of the present disclosure.

FIG. 1 is a schematic diagram illustrating an example system for determining whether one or more advanced driver assistant system (ADAS) features are operational in a vehicle during a trip, in accordance with embodiments of the present disclosure. The system 100 includes data processing system 102, a storage system 104, a network 106, a mobile computing device 108, and a vehicle 110. The storage system 104 includes one or more computer-readable storage mediums configured to receive and store sensor information and other information for determining whether one or more ADAS features of the vehicle are operational during a trip. Sensor information in this application can include raw sensor data, such as speed of the vehicle during a trip, and can also include processed sensor data, such as maximum speed during a trip or speed variance during a time window, etc.

A trip can include, for example, any instance of travel from an origin to a destination. In some cases, a trip is an instance involving a single transportation mode (e.g., a car) or a single role of a person being transported (e.g., a driver) or both. For example, a trip may be an instance of travel from a home to a store in a car. The driver of the car can have a mobile device 108 that includes a telematics application. During a trip, the telematics application can be running as a telematics application instance 120 on mobile device 108.

Mobile device 108 can be a smartphone, tablet, laptop, or other portable electronic device that can receive sensor data, process sensor data, and transmit sensor data across a network. Mobile device 108 can also run software applications, including telematics applications. The mobile device 108 can accumulate vehicle telematics information during the trip. The mobile device 108 can process the vehicle telematics information to determine whether one or more ADAS features are operational. The mobile device 108 can communicate the determination to server 102 through network 106. In some embodiments, the mobile device 108 can send vehicle telematics information to the server 102 through network 106. Mobile device 108 can receive vehicle telematics information while the telematics application instance 120 is running on the mobile device 108. The mobile device 108 can receive vehicle telematics information from a variety of sources, including from sensors associated with the mobile device 108 itself, sensors associated with the vehicle, sensor tags 112, after-market sensors, vehicle diagnostics information, vehicle processor register information, satellite receivers, etc.

The telematics information can be stored in storage 104. Storage 104 is associated with server 102. The server 102 can include one or more hardware processors 114. The storage 104 can include computer-readable media storing instructions that when executed cause the one or more hardware processors 114 to process the telematics information to determine whether one or more ADAS features of vehicle 110 is operational (or was operational during the associated trip).

Generally, telematics information includes information from vehicle GPS systems, onboard vehicle diagnostics, wireless telematics devices (e.g., tags), onboard sensors, mobile device sensors, and black box technologies to record and transmit vehicle data, such as speed, location, maintenance requirements and servicing, and cross-reference this data with the vehicle's internal behavior.

Generally, sensor information (or sensor data) refers broadly to information that is sensed by a sensor. The sensor can be part of the vehicle, such as on-board cameras or LiDAR systems. The sensor can be part of the mobile device, such as a magnetometer or satellite receiver. The sensor can be part of a sensor tag 112 that is attached to the vehicle, which can include a gyroscope or an accelerometer. In some embodiments, an external sensor can be individually attached to the vehicle and communicatively coupled to the mobile device 108, so that information sensed by the external sensor can be sent to the mobile device 108. An example of an external sensor can be an after-market dashcam. Sensor information can be accumulated by the mobile device 108 and processed by the mobile device 108 to determine whether an ADAS feature is active.

Network 106 can include any type of data network that facilitates the communication of information between mobile device 108 and server 102. For example, network 106 can be a cellular network, a Wi-Fi connection to the Internet, or other type of network.

Vehicle 110 can be any type of vehicle that is operated, at least some of the time, by a human driver. Vehicle 110 can include one or more ADAS features, as describe herein. In some embodiments, vehicle 110 can be a connected vehicle. The term connected vehicles refers to applications, services, and technologies that connect a vehicle to its surroundings. A connected vehicle includes the different communication devices (embedded or portable) present in the vehicle, that enable in-car connectivity with other devices present in the vehicle and/or enable connection of the vehicle to external devices, networks, applications, and services. Applications include everything from traffic safety and efficiency, infotainment, parking assistance, roadside assistance, remote diagnostics, and telematics to autonomous self-driving vehicles and global positioning systems (GPS). Typically, vehicles that include interactive advanced driver-assistance systems (ADASs) and cooperative intelligent transport systems (C-ITS) can be regarded as connected. Connected-vehicle safety applications are designed to increase situation awareness and mitigate traffic accidents through vehicle-to-vehicle (V2V) and vehicle-to-infrastructure (V2I) communications.

ADAS technology can be based on vision/camera systems, sensor technology, vehicle data networks, V2V, or V2I systems. Features may include adaptive cruise control, automate braking, incorporate GPS and traffic warnings, connect to smartphones, alert the driver to hazards, and keep the driver aware of what is in the blind spot. V2V communication technology could mitigate traffic collisions and improve traffic congestion by exchanging basic safety information such as location, speed, and direction between vehicles within range of each other. It can supplement active safety features, such as forward collision warning and blind-spot detection. Connected vehicles technologies are also expected to be a fundamental component of automated driving as they will allow the exchange of sensor and awareness data among vehicles, cooperative localization and map updating, as well as facilitate cooperative maneuvers between automated vehicles.

Figure 2:
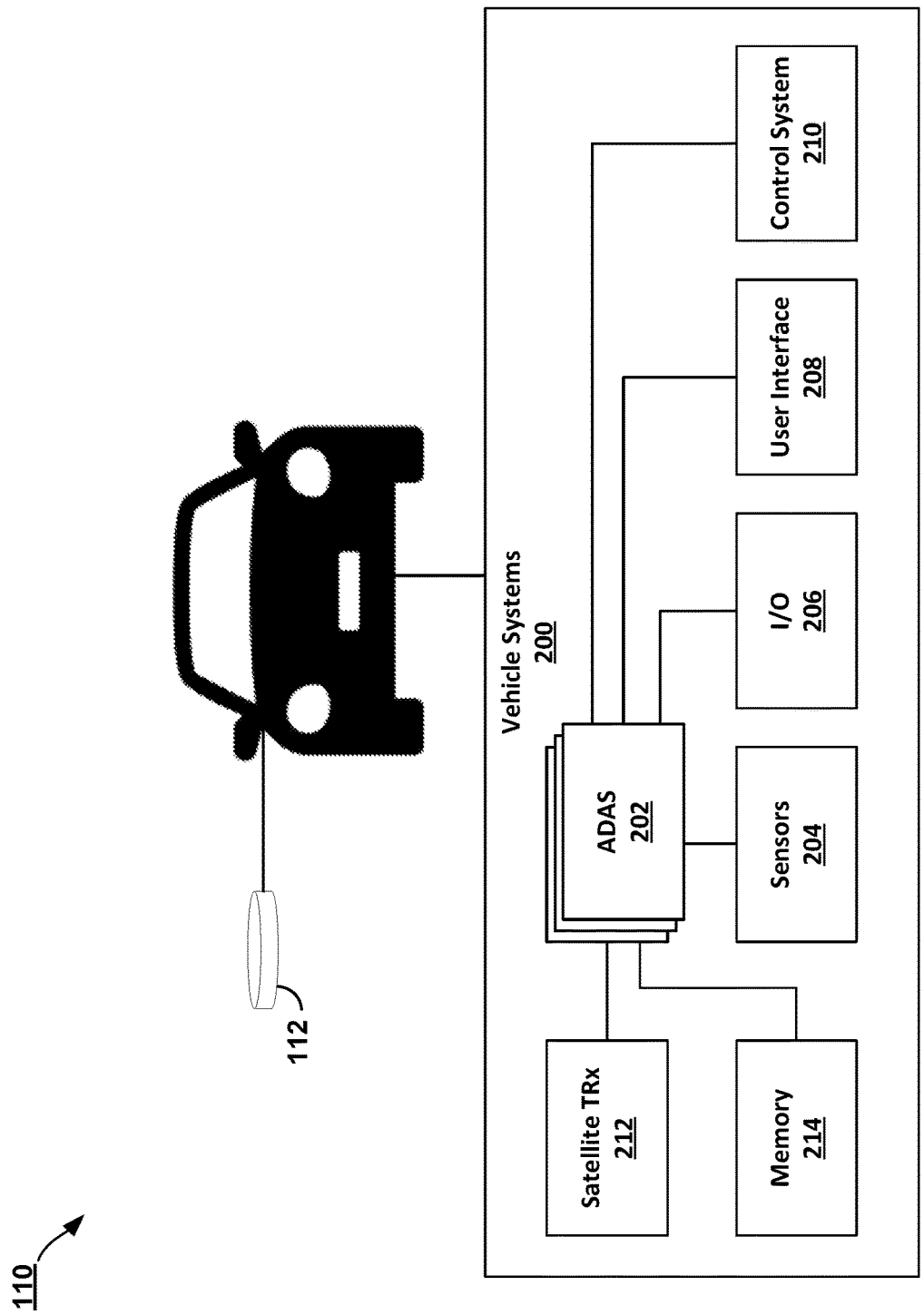
FIG. 2 is a schematic diagram illustrating an example vehicle that includes one or more ADAS features in accordance with embodiments of the present disclosure.

FIG. 2 is a schematic diagram illustrating an example vehicle that includes one or more ADAS features in accordance with embodiments of the present disclosure. A transportation mode may include, for example, any form, conveyance, or manner of travel, such as car, bus, truck, train, boat, bicycle, motorcycle, pedestrian (walking or running), off-road vehicle, or airplane, among others. A vehicle 110 can include a car, bus, train, motorcycle, mobile home, truck, or any such similar machines configured to transport users of the mobile computing devices 108.

Vehicle 110 can include vehicle systems 200. Vehicle systems 200 can include one or more ADAS features 202. ADAS features 202 can include, but are not limited to, any one or a combination of adaptive cruise control, lane change assist, lane departure warning, lane keep assist, traction control, dynamic power distribution to wheels, blind spot monitor, collision warning, collision avoidance, automatic or emergency braking, satellite navigation, self-driving capabilities, pedestrian detect/avoidance, traffic sign recognition, surround view camera, automated parking, night vision, traction control, and others. This list is not exhaustive. Other ADAS features can be detected using similar techniques described herein.

The vehicle systems 200 can include one or more sensors 204. Sensors 204 can include cameras, LiDAR, radar, pressure sensors, odometer, speedometer, global positioning, map data, other position data, tire pressure monitors, power distribution monitors, or other types of sensors.

Vehicle systems 200 also include an input/output (I/O) 206. I/O 206 can be used to accommodate aftermarket devices, such as aftermarket cameras. For example, a vehicle not equipped with a back-up camera can use an aftermarket camera to couple to the vehicle's ADAS (either through a wire or via a wireless connection). The ADAS features can use image information from the aftermarket camera to provide one or more driver assistant features, such as parking or maintaining safe distances between vehicles. I/O 206 can also interface with the vehicle's systems to access exposed system information, including whether ADAS features are available and whether available ADAS features were active during a period of time (e.g., during a trip). The exposed system information can be included in the ADAS feature operational likelihood determination, if available.

Vehicle systems 200 also include a user interface 208. User interface 208 can allow a driver to turn ADAS features on or off. User interface 208 can also be used to customized ADAS features, such as setting preferred speeds, vehicle separate distances (e.g., as a function of speed), customization of feedback or alerts, or other types of customization.

Vehicle systems 200 can include control system 210. Control system 210 can include any system that is involved in the control of the vehicle. The ADAS 202 can provide inputs or instructions to the control system 210 to control the vehicle. For example, automatic parking can steer and accelerate and brake the vehicle for parking. Lane keep assist can cause the vehicle to steer back into a lane. Adaptive cruise control can control the speed, acceleration, and braking of the vehicle. Other examples are contemplated and within the scope of this disclosure.

The vehicle system 200 can also include satellite transceiver 212. Satellite transceiver 212 can receive global positioning satellite (GPS) or global navigation satellite system (GNSS) information. Memory 214 can store map data, driver information, vehicle information, or other data for ADAS consumption.

Figure 3:
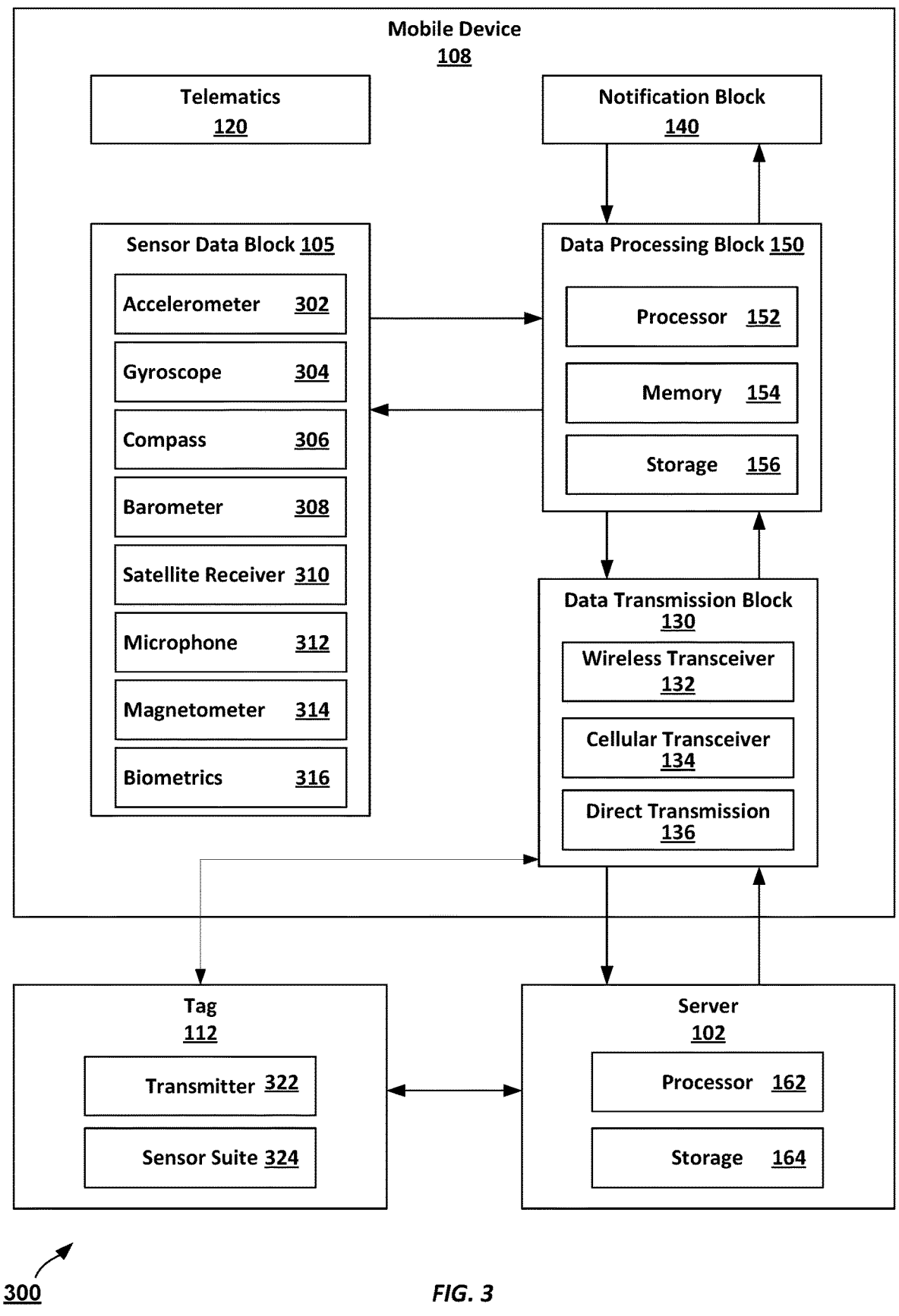
FIG. 3 is a schematic diagram illustrating a system for using sensor information to determine whether an ADAS feature is operational in accordance with embodiments of the present disclosure.

FIG. 3 is a system diagram illustrating a system 300 for using sensor information to determine whether an advanced driver assistant system (ADAS) feature is operational in accordance with embodiments of the present disclosure. System 300 includes a mobile device 108 having a number of different components. Mobile device 108 may include a sensor data block 105, a data processing block 150, a data transmission block 130, and optionally a notification block 140. The sensor data block 105 includes data collection sensors as well as data collected from these sensors that are available to mobile device 108. This can include external devices connected via Bluetooth, USB cable, etc. The data processing block 150 includes storage 156, and manipulations done to the data obtained from the sensor data block 105 by processor 152. This may include, but is not limited to, analyzing, characterizing, subsampling, filtering, reformatting, etc. Data processing block 150 also include memory 154, such as cache or RAM. Data transmission block 130 may include any transmission of the data off the mobile device 108 to an external computing device that can also store and manipulate the data obtained from sensor data block 105. Data transmission block 130 can include a wireless transceiver 132 for sending and receiving information over a wireless connection, such as Wi-Fi, RF, or Bluetooth. Data transmission block 130 can also include a cellular transceiver 134 for communicating over a cellular network, such as those using 3GPP protocols. The data transmission block 130 also includes a direct transmission block 136, which can use wired connections or touch connections to exchange data.

The external computing device can be, for example, a server 102. Server 102 can comprise its own processor 162 and storage 164. Notification block 140 may report the results of analysis of sensor data performed by the data processing block 150 to a user of the mobile device 108 via a display (not shown). For example, notification block 140 may display or otherwise report a score for a trip or for a plurality of trips to a user of the mobile device 108. In one embodiment, mobile device 108 may further include a telematics application 120 that can run instances of the telematics application to collect and assemble sensor data, as well as performing processing on the sensor data to make assessments.

Some embodiments are described using examples where driving data is collected using mobile devices 108, and these examples are not limited to any particular mobile device. As examples, a variety of mobile devices including sensors such as accelerometers 302, gyroscopes 304, compasses 306, barometers 308, location determination systems such as global positioning system (GPS) receivers 310, microphone 312, magnetometer 314, communications capabilities, and the like are included within the scope of the invention. Exemplary mobile devices include smart watches, fitness monitors, Bluetooth headsets, tablets, laptop computers, smart phones, music players, movement analysis devices, and other suitable devices. One of ordinary skill in the art, given the description herein, would recognize many variations, modifications, and alternatives for the implementation of embodiments.

To collect data associated with the driving behavior of a driver, one or more sensors on mobile device 108 (e.g., the sensors of sensor data block 105) generate sensor data during a period when mobile device 108 is with the driver when operating a vehicle—also termed herein "a drive" or "a trip." With many mobile devices 108, the sensors used to collect data are components of the mobile device 108, and use power resources available to mobile device 108 components, e.g., mobile device battery power and/or a data source external to mobile device 108.

Some embodiments use settings of a mobile device to enable different functions described herein. For example, in Apple iOS, and/or Android OS, having certain settings enabled can enable certain functions of embodiments. For some embodiments, having location services enabled allows the collection of location information from the mobile device (e.g., collected by global positioning system (GPS) sensors, and enabling background app refresh allows some embodiments to execute in the background, collecting and analyzing driving data even when the application is not executing. In some implementations, alerts are provided or surfaced using notification block 140 while the app is running in the background since the trip capture can be performed in the background. These alerts may facilitate driving behavior modification. Further disclosure regarding scoring and behavior modification may be found in U.S. patent application Ser. No. 15/413,005, filed Jan. 23, 2017, herein incorporated by reference in its entirety.

In some embodiments, a sensor tag 112 can also provide sensor information to the mobile device 108 or the server 102, or both. Sensor tag 112 can include a transceiver 322. Transceiver 322 can be configured to communicate with the mobile device 108 and/or the server 102 over a wireless network, such as a Bluetooth network, a Wi-Fi network, or a cellular network, among others. Tag 112 also includes a sensor suite 324, described below.

Figure 4:
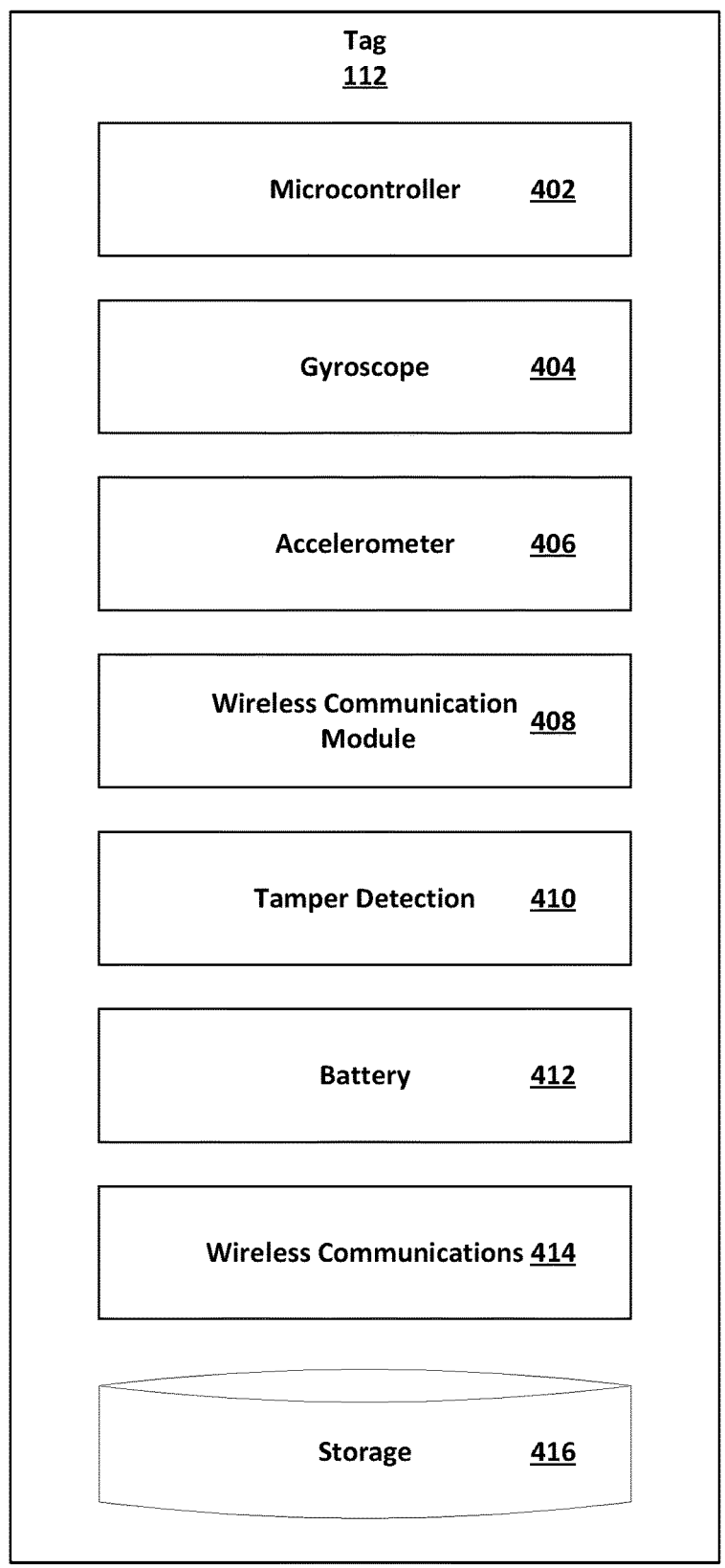
FIG. 4 is a schematic diagram of a sensor tag in accordance with embodiments of the present disclosure.

FIG. 4 is a schematic diagram of a sensor tag 112 in accordance with embodiments of the present disclosure. The tag 112 contains a processor in the form of a microcontroller 402 capable of executing programmed instructions ("firmware"), which controls the operation of the various other components of the tag. The components include a low-power wireless communication module 408 to communicate with a mobile communications device 108 in the vehicle or the server 102.

The components also include one or more sensors, such as one or more of a three-axis accelerometer 406, a three-axis gyroscope 404, a light sensor, a pressure sensor, and a magnetometer, among others.

The accelerometer 406 measures the acceleration of the tag 112 and thereby of the vehicle 110 when the vehicle is moving and reports the data to the microcontroller 402. The accelerometer and other sensors provide digital output generally via a serial interface standard.

In some embodiments, some or all the components in the tag are low-power devices, so that one or two small coin-cell batteries suffice for the tag to run for several thousands of hours of driving time (multiple years of operation). The firmware of the microcontroller 402 on the tag 112 records telematics data mostly only when the vehicle is moving. When the vehicle is not moving, the components of the tag 112 are in powered-down or in an ultra-low-power idle state. An "acceleration state machine" controls the different states of the tag 112.

In the illustrated example, wireless communication module 408 can use a short range wireless communications protocol. In some embodiments, the short range wireless communications protocol is Bluetooth, but any low-power communication could be used. Bluetooth Low Energy (BLE) meets the desired power requirements and is widely available on commodity smartphone devices. In an example embodiment the microcontroller 402 and wireless communications module 408 including antenna and crystal are combined in a single chip.

The tag 112 records acceleration and other sensor data. The sensor tag 112 can include a wireless communications module 414. Wireless communications module 414 can stream data to the mobile device 108 over the short-range wireless communication link, which will in turn process that data and transmit at least a portion of the received and processed data via a wireless communications network 106 such as 802.11 (WiFi) or cellular network to a server 102 with an associated database storage 104. In some embodiments, wireless communications module 414 can also support long range communications, such as cellular communications.

The tag 112 includes a memory 416 in the form of a flash storage, for example using a serial flash memory. The memory 416 stores data about trip start/end times, acceleration and other sensor data including telematics events detected by the firmware such as hard braking, accelerations, and turns, unexpected movements of the tag, collisions or crashes, and debugging logs together with time stamps. The tag 112 also includes random access memory (RAM) used by the firmware and read-only memory (ROM) used to store configuration data and executable instructions.

The tag 112 includes a battery 412 for providing power to the device. The battery may be in a coin cell form factor, standard AAA or AA, or solar. It is important to note that in the preferred embodiment the tag is not tethered to any wired source of power, such as the vehicle's electrical power supply or the vehicle's standard on-board diagnostic (OBD) port. Because it does not have an unbounded source of energy, its operation includes methods to use energy frugally and carefully, as described below.

The advantages of not requiring a tethered power source are that there is no complicated or cumbersome installation procedure as with an installed black box. Plugging the tag into the vehicle's OBD port is also not desirable given that these types of devices could potentially interfere with the vehicle's on-board systems. The capital and operational costs of a telematics system with the untethered tag are considerably lower than black boxes and OBD devices and are more scalable for insurance companies.

The tag 112 includes hardware and firmware instructions on the microcontroller 402 that measure and report the power level of the battery to the mobile device over the low-power wireless communication link. The hardware may be implemented with an intermediary circuit (not shown) connected between the battery and the microcontroller 402 to measure the voltage of the battery. When the battery's energy reserves are found to be lower than a threshold, the user is given a warning on the mobile device in order to warn users when the battery is going low.

In the illustrated example the short range wireless communications protocol is Bluetooth, but any low-power communication could be used. Bluetooth Low Energy (BLE) meets the desired power requirements and is widely available on commodity smartphone devices. In an example embodiment the microcontroller 402 and wireless communications module 408 including antenna and crystal are combined in a single chip.

The tag 112 includes a tamper detection mechanism 410. The anti-tamper mechanism uses one or both of the following two techniques.

The first method uses the accelerometer and using an orientation algorithm where the tag 10 once secured to the vehicle will have knowledge of its correction angle in relation to the vehicle travelling direction. This algorithm computes the rotation matrix that converts from the axes of the tag's accelerometer 406 to the axes corresponding to the vehicle's frame of reference. Should the tag 112 experience any sudden changes in this orientation the most likely reason is a movement of the affixed tag, which would be considered tampering. This tampering event will be recorded in the tag flash memory and transmitted securely to the backend server. The detection of such tampering reduces potential fraud.

The second method uses a light sensor chip included in the tag 112, which will be covered by the tag housing. When removing the tag from its intended position, the piece of the housing will be broken, and the light sensor will be exposed. This, in turn, will trigger a tamper event, which will be transmitted to the flash memory 416 and then sent via the mobile device 108 to the server 102.

Figure 5:
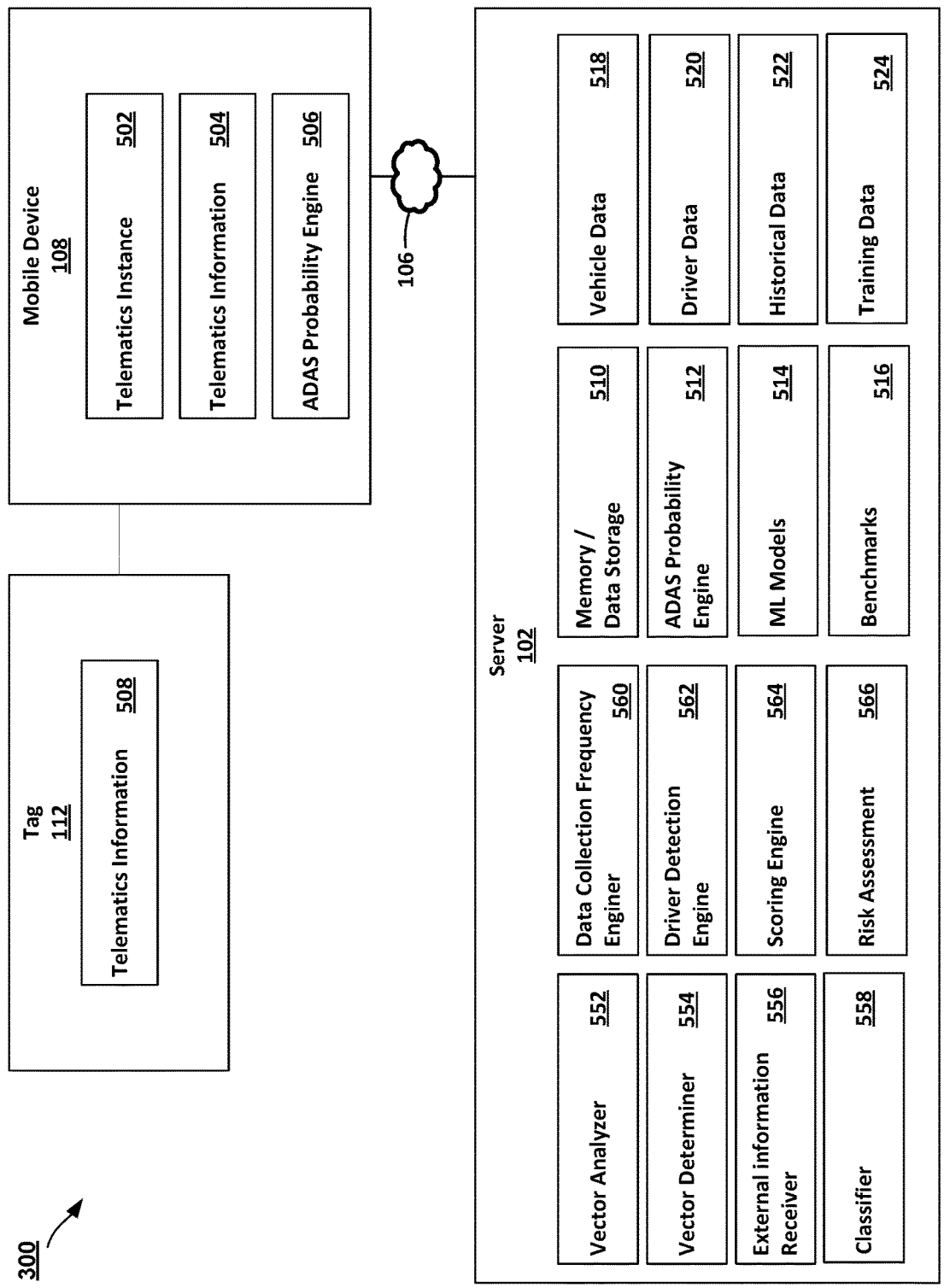
FIG. 5 is a schematic diagram of a system for determining ADAS feature operational likelihood in accordance with embodiments of the present disclosure.

FIG. 5 is a schematic diagram of a system 300 for determining ADAS feature operational likelihood in accordance with embodiments of the present disclosure. System 300 can include a server 102 that communicates with mobile device 108 in accordance with embodiments of the present disclosure. In some embodiments, server 102 may provide functionality using components including, but not limited to vector analyzer 552, vector determiner 554, external information receiver 556, classifier 558, data collection frequency engine 560, driver detection engine 562, and scoring engine 564. These components may be executed by processors (not shown) in conjunction with memory (not shown). Server 102 may also include data storage 510. It is important to note that, while not shown, one or more of the components shown operating within server 102 can operate fully or partially within mobile device 108, and vice versa.

To collect data associated with the driving behavior of a driver, one or more sensors on mobile device 108 (e.g., the sensors of sensor data block 105) may generate sensor data during a period when mobile device 108 is with the driver when operating a vehicle—also termed herein "a drive" or "a trip." Once the mobile device sensors have collected data (and/or in real time), some embodiments analyze the data to determine acceleration vectors for the vehicle, as well as different features of the drive. For example, driver detection engine 562 may apply one or more processes to the data to determine whether the user of the mobile device 108 is a driver of the vehicle. Other examples are processes to detect and classify driving features using classifier 558, and determine acceleration vectors using vector analyzer 552 and vector determiner 554. In some embodiments, external data (e.g., weather) can be retrieved and correlated with collected driving data.

As discussed herein, some embodiments can transform collected sensor data (e.g., driving data collected using sensor data block 105) into different results, including, but not limited to, analysis of braking behavior, analysis of acceleration behavior, vehicle speeds and speed variance ("speed information"), and other trip information obtained from sensors.

Server 102 can receive telematics information and other "trip" information (together, accumulated sensor data from a mobile device 108 running a telematics application instance 502. The telematics information and other "trip" information can include sensor data from one or more sensors describe above. The sensor data can be used by the server for a variety of analytics, including assessing driving scores, driver distraction, risk assessments, and other analytics. The server 102 can also use the sensor information to determine whether an ADAS feature was likely to have been operational during the trip or during a portion of the trip.

The server 102 can include a memory 510 that includes a non-transitory, computer-readable storage medium for storing instructions that, when executed, cause a hardware processor execute operations. The memory 510 can store an ADAS probability engine 512. ADAS probability engine 512 can use sensor and other telematics information received from, e.g., a mobile device 108 to determine the likelihood (the probability) that an ADAS feature was operating in a vehicle during a trip. In some embodiments, the ADAS probability engine 512 can compare the sensor information for a trip received from the mobile device 108 against known benchmarks 516. The benchmarks 516 can be associated with an ADAS feature and include sensor information values that were observed for one or more representative vehicles while an ADAS feature was functioning. A benchmark 516 for an ADAS feature can be vehicle-specific or can be averaged across multiple vehicles or vehicle types. Put simply, a benchmark 516 represents information that can be used to identify whether an ADAS feature was operational during a trip.

Benchmarks can be determined by correlating telematics information and other vehicle movement information with periods of time when it is known that an ADAS feature was active. Benchmarks can be trained using vehicle movement information for periods of time when it is known that ADAS features are not operational. The probability that any particular ADAS feature was operational during a trip can be determined by evaluating the frequency of the various benchmarks in known periods of ADAS use vs periods when ADAS was known not to be in use (i.e., the training data), and to look at the similarity of a period of driving the values in those benchmarks.

Benchmarks 516 can include speed thresholds, speed variance thresholds, maximum speeds, maximum speed variance thresholds, acceleration thresholds, acceleration variance thresholds, braking thresholds, braking timing thresholds, and other information that can be observed by a sensor during a trip and correlated to an operational ADAS feature. Other examples can include auditory signaling, such as noise made by the vehicle when a lane departure warning is active, noise made from steering wheel or seat haptics, noise made from road humps, etc. The benchmark 516 can include representative image data for determining whether a driver is holding a steering wheel or determining how close a neighboring vehicle is for a period of time.

Benchmarks 516 can established and refined through training of machine learning models 514. Machine learning models 514 can be used to determine the likelihood that an ADAS feature was on during a trip. Machine learning models 514 can include neural networks, decision trees, regression models, filters, or other types of machine learning algorithms. The machine learning models 514 can be trained using training data 524 to establish benchmarks 516 that are used by the machine learning models 514 to perform assessments of sensor information. Training data 524 can be established using vehicle data 518, driver data 520, historical data 522, or other information from other sources. Training data 524 can also be observed from real-world testing of vehicles using an ADAS feature, and correlating the observed information with the operation of the ADAS feature.

Benchmarks, thresholds, and other aspects of the machine learning models 514 can be improved or refined using, among other things, vehicle data 518. Vehicle data 518 can include information specific to vehicle makes and models and years, including vehicle identification numbers. The vehicle data 518 can provide information about whether an ADAS feature is available for the vehicle and, in some cases, can determine if the specific vehicle in question includes the ADAS feature.

Benchmarks, thresholds, and other analytical functions can be refined using, among other things, driver data 520. Driver data 520 can include driving habits and driving scores and driving performance characteristics of the driver of the trip. The driver can be a person associated with the vehicle or with the telematics application instance on the mobile device. The driver performance characteristics can be used to refine the benchmarks and thresholds used by the machine learning models 514. Again, the machine learning models 514 can distinguish between human behavior and automation behavior, so using driver-specific information in the determination of thresholds and benchmarks can increase the reliability of the machine learning models 514 in making the distinction between a human driver and an automation.

Likewise, historical data 522 can be used to refine the benchmarks and thresholds. The historical data 522 can include information from other drivers, other ADAS systems, or other historical information that can be used to inform and refine the benchmarks and thresholds or otherwise improve the performance of the machine learning models 514. ADAS may also improve over time, resulting in changing threshold variances. New data can be compared against historical data to determine improvements and refine benchmarks and thresholds for the machine learning models.

The following provides examples of how sensor information from a trip can be used to determine the likelihood of ADAS feature operation. Each example can be used individually using an algorithm or machine learning model; or, multiple examples can be used to increase the reliability of the overall results from the computational models.

a) Adaptive cruise control has smoother changes in velocity or speed than human drivers. For a sliding window of T seconds of acceleration, outlying values of changes in velocity above or below predetermined benchmarks or thresholds can be discarded. The variance of the remaining change in velocity values can be calculated. If the change in speed exceeds threshold S then the probability of adaptive cruise control increases as the variance drops.

In example a) sensor information includes speed of the vehicle during a time period that the speed data was collected. That time period can be the duration of a trip, the aggregation of speed data across multiple trips in a day (e.g., driver out running errands), or data collection period for the sensor tag or the telematics application running on the mobile device. A sliding window of time T can be chosen or predetermined for the specific analysis described above.

A first benchmark can represent a maximum acceleration value threshold for eliminating outlying data from the analysis. A second benchmark can represent a minimum acceleration value threshold for eliminating outlying data from the analysis. These first and second benchmarks can be established using statistical analysis of the speed information in real-time or can be predetermined. Predetermined benchmarks for maximum and minimum changes in speed (acceleration) can be based on relativistic values, such as percentage variances from average or instantaneous values. Or predetermined benchmarks for maximum and minimum changes in speed can be absolute values. Again, predetermined benchmarks can be established from real-world testing and training.

A third threshold for example a) is the change in speed threshold S. The vehicle can control its speed using automation, which has more precise control over the acceleration that a human would using a pedal. The acceleration performed by the vehicle when adaptive cruise control is active, for example, demonstrates less variance in the change in speed within a time window than if a human were driving. Threshold S defines how smoothly the vehicle accelerated within the time window. Threshold S could also define limits of the change in acceleration within the time window, where the change in acceleration can represent variance in the change in speed as the vehicle accelerates. The change in speed threshold S can be determined using real-world testing of adaptive cruise control and making sensor information observations.

The change in speed threshold S can be refined using aggregated data for different vehicles, drivers, adaptive cruise control systems, or other refinement. For example, vehicle data 518 can be used. A vehicle of a first make and model might have a different adaptive cruise control than a vehicle of a second make and model, so the observed acceleration for each might be slightly different. Refining the threshold S using vehicle-specific information can increase the accuracy of the machine learning models. Also driver data 522 can be used. Driver-specific driving habits and performance characteristics and scoring histories can be used to refine the threshold S.

b) Adaptive cruise control has a distinctive maximum speed above which they will not remain (e.g., for some predefined amount of time). For humans, the peak speed across a window of time is more variable. A sliding window (i) of speed of T seconds (e.g. T=5 seconds) can be used to compute a maximum speed Amax(i) and minimum speed Amin(i). The Amax(i) and Amin(i) can be evaluated across N windows (e.g., N=20). If maxi(Amax(i))−mini(Amin(i)) is less than some threshold D, then the variance of the Amax(i) is computed. The likelihood of adaptive cruise control being operational increases as the variance of the Amax(i) drops.

In example b), the benchmark time window size and the number of time windows can be predetermined using statistical analyses or observations of times and windows that provide accurate results for the computation of the variance of max speed. The threshold D can also be determined statistically and/or through observations. The threshold D can be a benchmark for distinguishing between a human driver and an automation, such as the adaptive cruise control. Threshold D can be driver or vehicle-specific, or can be a more generic value based on a broader sourcing of information. Threshold D can be refined over time to improve the accuracy of the machine learning models 514. Threshold D can be refined, for example, using driver-specific data, such as maximum speed variance observed for a driver when it is known that ADAS is not active. Threshold D can be refined over time as more information is learned about both driver behavior and ADAS performance.

c) Adaptive cruise control will accelerate to a maximum speed more rapidly than a human, but then stop accelerating at that speed. In particular, if the change in speed is measured as A' over T' seconds, where: A'>threshold A, T'>threshold T. The likelihood of adaptive cruise control increases (or does not decrease) with A' and T'. In some embodiments, a the acceleration to the max speed stops and the max speed is maintained with less variance in an ADAS system than for a human driver. A human driver might accelerate to max speed slowly or quickly, but may demonstrate higher variance in max speed after max speed is reached.

Threshold A and threshold T represent benchmarks distinguishing between human activity and automation. Each can be identified and refined in a similar manner as described above.

d) Other sensor modalities can also be used to collect information that can be input into the one or more machine learning models. For example, humans typically decelerate prior to a turn; adaptive cruise control will decelerate during the turn. Speed information (braking) can be used to determine changes in speed in a time period. But also, map matching of the road network coupled with GPS position data indicates when the road is turning. Gyroscopic sensor data indicates when the vehicle is turning. Accelerometer data indicates when the vehicle begins braking. If braking precedes vehicle and road turning by less than time T, the likelihood of adaptive cruise control is elevated.

In example d), additional sensor information beyond speed and time are being incorporated as inputs to a machine learning model for determining the likelihood of adaptive cruise control being functional in the vehicle during the trip. The machine learning models 514 can use information from many different sensor modalities as inputs in computing a probability of ADAS feature operational state.

e) Another example is that adaptive cruise control is more common on larger roads. In particular, the likelihood is elevated on road type 0, 1, 2, but not 3 or 4, as determined by map-matching and GPS position data.

f) In-cabin video can be used to detect if the driver removes their hands from the steering wheel but the wheel moves. For example, sensor tags can include video monitoring to capture image data. The sensor tag can send image data to the mobile device 108 for accumulation of sensor data that is eventually processed for ADAS operational likelihood (among other reasons). A forward-facing dash cam can be used to measure the distance from the preceding car. If adaptive cruise control is activated, this distance should be unusually constant as a function of speed; if a human is driving, the distance will have greater variability.

The above provides examples of how sensor information can be used to determine a probability of the operational state of an adaptive cruise control. Other ADAS features' operational states can also be gleaned from other sensor information. For example, a microphone included in a smart device or sensor tag can be used to detect an audible lane departure warning sound. The machine learning models 514 can be trained to distinguish between lane departure warning alert sounds and other sounds. Lane departure warning alert sounds can be unique for different makes and models of vehicles, so machine learning models 514 for audible lane departure warning determination can also include vehicle information.

In some embodiments, a physics-based approach can be used to assess ADAS feature operational likelihood. For example, it can be assumed that vehicle movement metrics for a computer (i.e., the ADAS) is more stable or changes to vehicle movement is more stable, as compared to similar metrics for a human operator. For example, speed variation values can be assessed during a trip using, e.g., a sliding window. Differences in speed variation for different portions of the trip can indicate a human driver or an adaptive cruise control being operational. Other factors can also be used to refine the probability assessment. For example, low speed variance at higher speeds can result in a higher likelihood of adaptive cruise control being on, as opposed to low speed variation at lower speeds. Low speed variation at low speeds can still indicate adaptive cruise control functionality being operational, such as during gridlock situations where a vehicle may be crawling at low speeds with frequent stops and starts. In such cases, speed variation can be used in addition to smoothness of acceleration and braking. The ADAS is more likely to accelerate and brake smoothly in comparison to a human driver.

Microphones can also pick up noise associated with lane departures, such as road humps. The machine learning models can be trained to use audible information to determine that the lane departure warning alert sounds come after or during road hump noises, which indicate that the vehicle departed lane and was alerted. The machine learning models can also be trained to detect changes in trajectory of the vehicle after the lane departure warning alert sound, indicating that the driver moved the vehicle back into the lane after hearing the lane departure warning alert sound. Cameras in the vehicle can also be used to visually capture indications of ADAS feature operation during a drive, such as driver hand position, signals or indicator lights, or other indications.

As can be seen from the above examples, sensor information can be used by machine learning models to determine the probability that an ADAS feature is operational. Noteworthy is that the mobile device 108 can also include machine learning models to perform the ADAS feature operational probability assessment. The mobile device 108 can use accumulated telematics information 504 from sensors on the mobile device 108, telematics information 508 from sensor tag 112, from vehicle 110, or other locations. The mobile device 108 can include an ADAS probability engine 506 similar to ADAS probability engine 512. The mobile device 108 can therefore perform similar ADAS feature probability calculations. The server 102 can update the ADAS probability engine 506 with training data occasionally to ensure reliability of machine learning models. The mobile device 108 can then send the probabilities to the server 102 for consumption, such as for risk assessments.

Server 102 can include a risk assessment engine 566. The ADAS features operational likelihood for one or more ADAS features is then aggregated across drives by the same driver, and used to provide a risk score to the driver and/or the insurer. The risk score can be provided on both the trip and user level.

Figure 6:
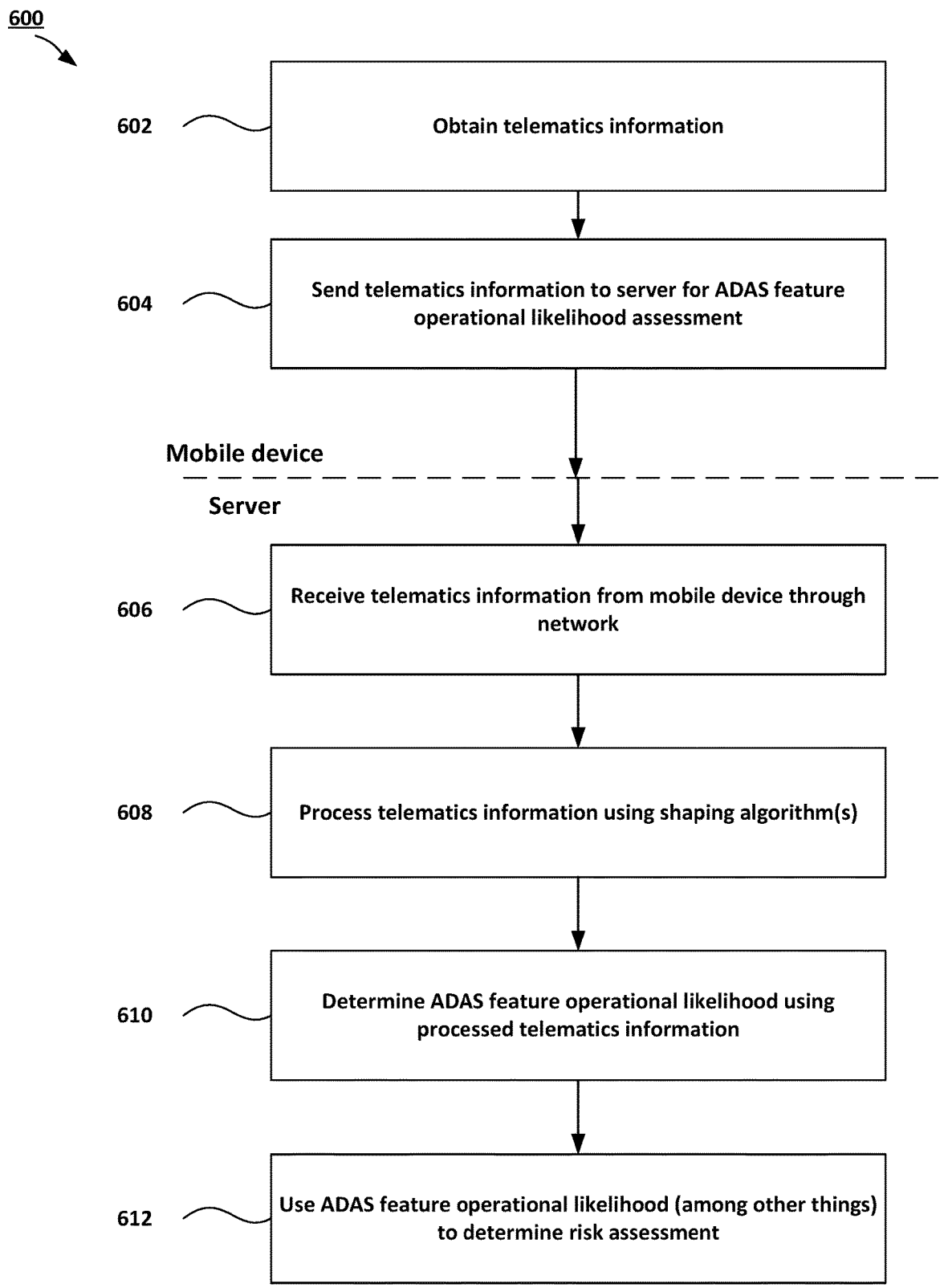
FIG. 6 is a process flow diagram for determining ADAS feature operational likelihood in a server in accordance with embodiments of the present disclosure.

FIG. 6 is a process flow diagram 600 for determining ADAS feature operational likelihood in a server in accordance with embodiments of the present disclosure. At the outset, telematics information (including sensor data) is obtained by a mobile device running a telematics application instance. (602). The sensor data can be obtained by the mobile device directly through internal sensors or from external sources, such as vehicle sensors, sensor tags, aftermarket sensors, etc. The mobile device can send the telematics information to a server for ADAS feature operational likelihood assessment. (604). For example, the mobile device can use a cellular connection to transmit telematics information to a server through a cellular communications protocol. The mobile device can use a Wi-Fi connection to transmit the telematics information to a server through the Internet. Other transmission schemes are contemplated and within the scope of the disclosure. The mobile device can stream the telematics information to the server on an ongoing basis, periodically, at predetermined times or points in a trip, or at the end of a trip. The server can also ping the mobile device to cause the mobile device to send data.

By controlling the timing of the transmission of the telematics information, a correlation can be made using other information between the telematics information and the driver. For example, by correlating the time of day and the route made on the trip, the telematics information can be correlated to a driver making a commute to work. The personal information associated with the telematics application instance can also be used to correlate the telematics information with the driver. The timing, route, driver ID, and other information can be used by the server not only in assessing ADAS feature operational likelihood, but also in assessing risk.

The server can receive the telematics information. (606). The server can process the telematics information using one or more shaping algorithms of the ADAS probability engine to shape the data for determining ADAS feature operational likelihood. (608). For example, the telematics information can include raw speed data and a duration of the trip. The one or more shaping algorithms can take the raw speed data to identify acceleration data, time window durations and number, jerk, or other information that the ADAS probability engine and associated algorithms can use to make ADAS feature operational predictions.

The ADAS probability engine can use the raw or processed telematics information to determine the likelihood that an ADAS feature was operational for a time period during the trip. (610). The time period can be the entire trip, segments of the trip, etc. The ADAS probability engine can, generally, compare telematics information against known benchmarks to assess the likelihood that an ADAS features was operational during the time period. In one example embodiment, the ADAS probability engine can make use of machine learning models, such as supervised machine learning models trained using training data. The ADAS probability engine can use telematics information, time period information, driver information, and/or other information as inputs. The ADAS probability engine can output a probability that an ADAS feature was operational during the time period.

The server can then use the ADAS feature operational likelihood (among other things) to determine risk assessment for the driver. (612). The likelihood can be aggregated across drives by the same driver, and used to provide a risk score to the driver and/or the insurer, or for other reasons. The risk score can be provided on both the trip and driver level. As an example, the ADAS probability engine can determine whether the lane departure warning went off during a drive (and how many times the lane departure warning went off during a trip), indicating that the vehicle made an unintended trajectory change that might have crossed a lane boundary. Other telematics information, such as image information of the driver, can be used to determine whether the driver was distracted during the unintended trajectory change. Mobile device accelerometer and/or gyroscope information can be used to determine that the driver was holding or moving the mobile device when the vehicle made the unintended trajectory change. All of these factors can be used to assess the risk of the driver or trip.

Figure 7:
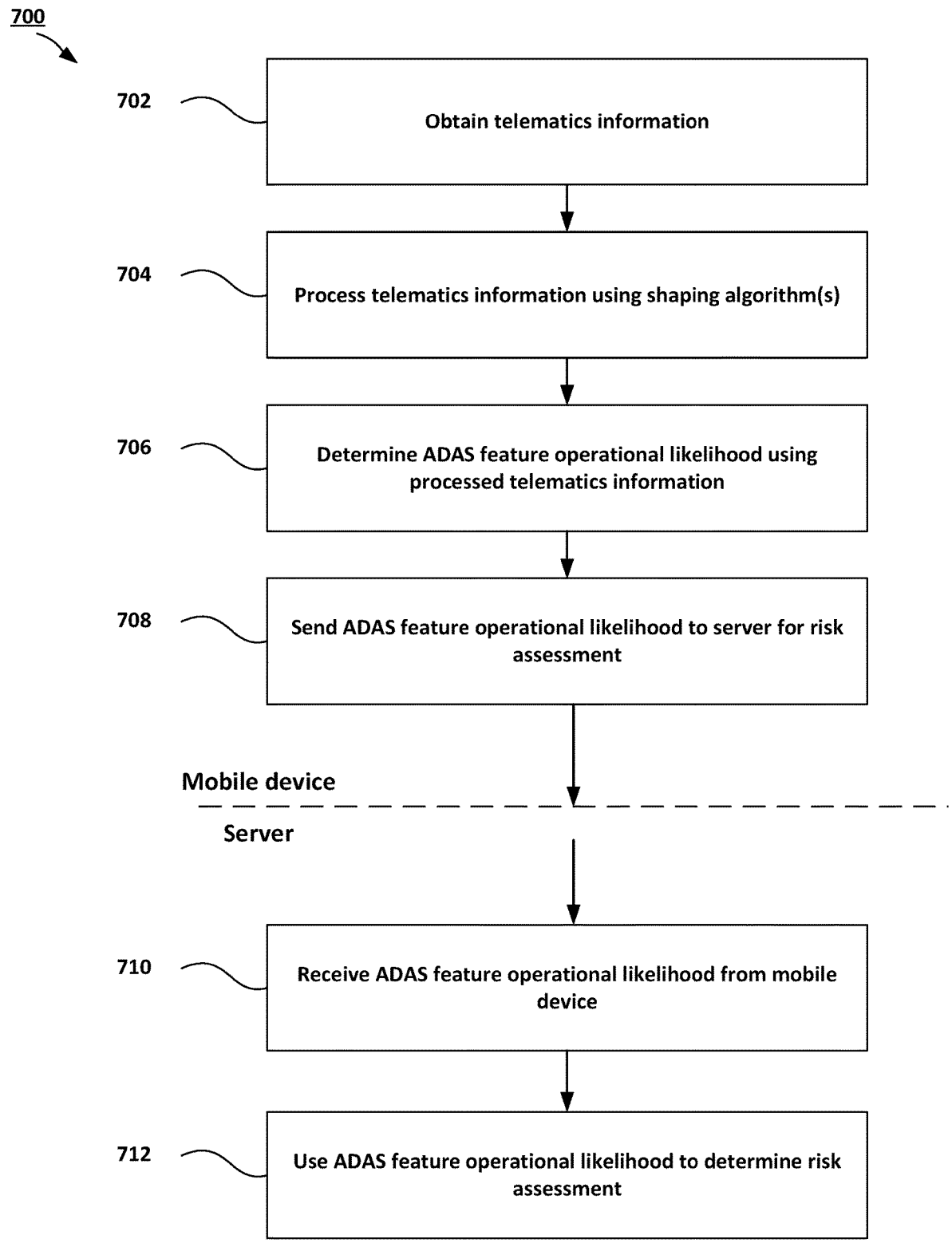
FIG. 7 is a process flow diagram for determining ADAS feature operational likelihood in a mobile device in accordance with embodiments of the present disclosure.

FIG. 7 is a process flow diagram 700 for determining ADAS feature operational likelihood in a mobile device in accordance with embodiments of the present disclosure. At the outset, telematics information (including sensor data) is obtained by a mobile device running a telematics application instance. (702). The sensor data can be obtained by the mobile device directly through internal sensors or from external sources, such as vehicle sensors, sensor tags, aftermarket sensors, etc. The mobile device can process the telematics information using one or more shaping algorithms of the ADAS probability engine to shape the data for determining ADAS feature operational likelihood. (704). For example, the telematics information can include raw speed data and a duration of the trip. The one or more shaping algorithms can take the raw speed data to identify acceleration data, time window durations and number, jerk, or other information that the ADAS probability engine and associated algorithms can use to make ADAS feature operational predictions.

The ADAS probability engine on the mobile device can use the raw or processed telematics information to determine the likelihood that an ADAS feature was operational for a time period during the trip. (706). The time period can be the entire trip, segments of the trip, etc. The ADAS probability engine can, generally, compare telematics information against known benchmarks to assess the likelihood that an ADAS features was operational during the time period. In one example embodiment, the ADAS probability engine can make use of machine learning models, such as supervised machine learning models trained using training data. The ADAS probability engine can use telematics information, time period information, driver information, and/or other information as inputs. The ADAS probability engine can output a probability that an ADAS feature was operational during the time period.

The mobile device can send the ADAS feature operational likelihood to a server. (708). For example, the mobile device can use a cellular connection to transmit telematics information to a server through a cellular communications protocol. The mobile device can use a Wi-Fi connection to transmit the telematics information to a server through the Internet. Other transmission schemes are contemplated and within the scope of the disclosure. The mobile device can send ADAS feature operational likelihood to the server on an on-going basis, periodically, at predetermined times or points in a trip, or at the end of a trip. The server can also ping the mobile device to cause the mobile device to send the ADAS feature operational likelihood.

By controlling the timing of the transmission of the ADAS feature operational likelihood, a correlation can be made using other information between the telematics information and the driver. For example, by correlating the time of day and the route made on the trip, the telematics information can be correlated to a driver making a commute to work. The personal information associated with the telematics application instance can also be used to correlate the telematics information with the driver. The timing, route, driver ID, and other information can be used by the server not only in assessing ADAS feature operational likelihood, but also in assessing risk.

The server can receive the ADAS feature operational likelihood. (710). The server can then use the ADAS feature operational likelihood (among other things) to determine risk assessment for the driver. (712).

Figure 8A:
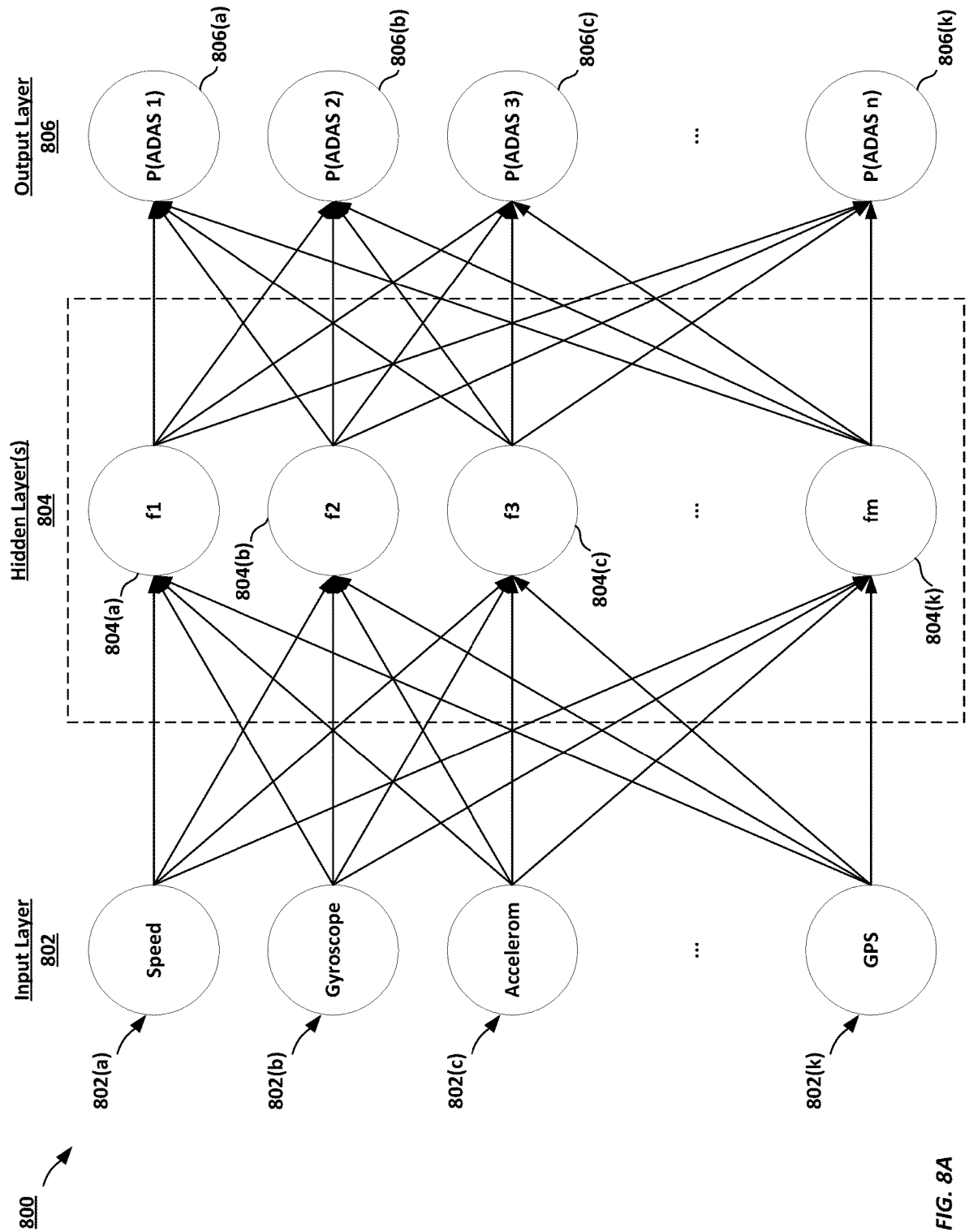
FIG. 8A is schematic diagram of an example neural network for determining ADAS feature operational likelihood using sensor information inputs in accordance with embodiments of the present disclosure.

FIG. 8A is a schematic diagram of an example neural network 800 for determining ADAS feature operational likelihood using sensor information inputs in accordance with embodiments of the present disclosure. The ADAS probability engine can include one or more machine learning models. The machine learning model can be chosen based on the available inputs. Put differently, a given set of input information might only support a subset of ADAS features. So, a the machine learning models for that subset of ADAS features can be selected to process the input information.

As an example, the machine learning models can include trained neural networks, such as the neural network 800. The neural network 800 can include in input layer 802. Input layer 802 can include one or more inputs 802(a)-802(k), where k represents an index of the last input. Each input 802(a)-802(k) represents a single telematics information. For example, input 802(a) can include speed information; input 802(b) can include gryoscope information; input 802(c) can include acceleration information; and input 802(k) can include GPS information. Other inputs can be included in the input layer 802.

The machine learning model can include an output layer 806. Output layer 806 can include one or more outputs 806(a)-806(k), one for each ADAS feature of interest. The output layer can include one or more outputs with a probability for an ADAS feature of interest being operational during the drive. For example, for a set of inputs, the neural network 800 can output a probability of P1 for ADAS 1 and a probability of P2 for ADAS 2, etc., through Pn for ADAS n. If the inputs do not support or are not relevant to, e.g., ADAS 2, P2 can be zero or close to zero.

The neural network 800 can include one or more hidden layers 804. The hidden layer(s) 804 can include one or more trained functions f(1) 804(a)-f(m) 804(k). The hidden layer functions can process the incoming input information to output a probability that an ADAS feature is operational. The hidden layer 804 functions can be trained using training data to get desired outcomes.

Neural network 800 is an example and not limiting of the type of machine learning models that can be used herein.

Other types of neural networks (or machine learning models) can be used without deviating from the scope of this disclosure.

Figure 8B:
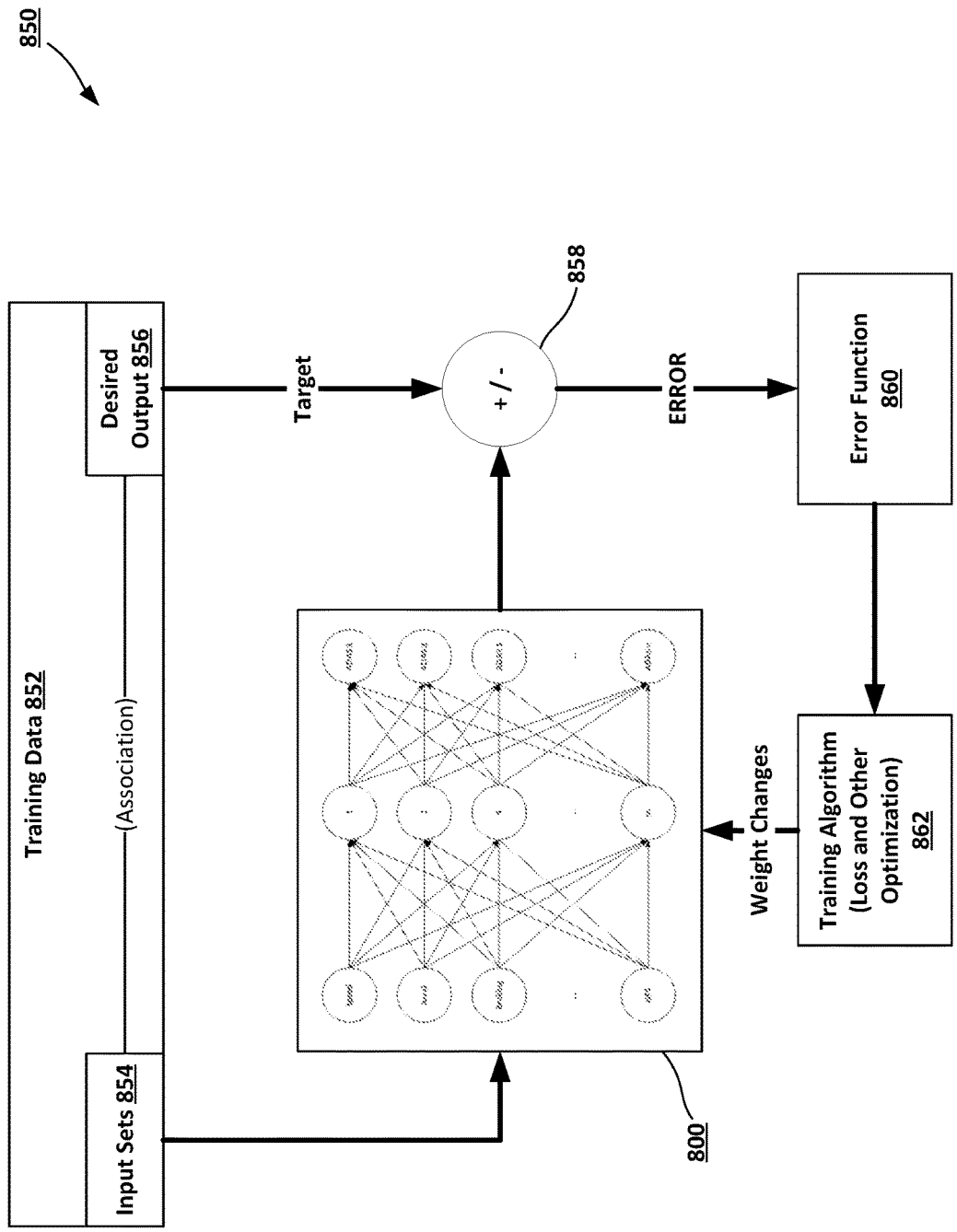
FIG. 8B is a schematic diagram of an example of neural network training system for determining ADAS feature operational likelihood in accordance with embodiments of the present disclosure.

FIG. 8B is a schematic diagram of an example of neural network training system 850 for determining ADAS feature operational likelihood in accordance with embodiments of the present disclosure. The training system 850 can include training data 852. Training data 852 can include input data sets 854 and desired output 856. The input data sets 854 can be correlated to desired outputs 856. Each input set 854 can include one or more telematics datum that can be received from a mobile device or processed by the server for use in the neural network 850. Each input set 854 can be correlated with a desired output from the neural network 850, so that the accuracy and reliability of the neural network 850 can be evaluated.

The input sets 854 are input into the neural network 800. The output of the neural network 800 is compared against the desired output 856 target values at comparator 858. The error can be reported to an error function 860. Error function 860 can instruct training algorithm 862 that optimizes loss functions and other functions in the neural network hidden layer(s). The error function 860 can provide error information that can be used to tune the training algorithm to increase the accuracy and reliability of the neural network 800 to obtain the desired results from a particular input data set. For example, the training algorithm 862 can make weight adjustments to the hidden layer functions. Other training systems can be used without deviating from the scope of the disclosure.

Figure 9:
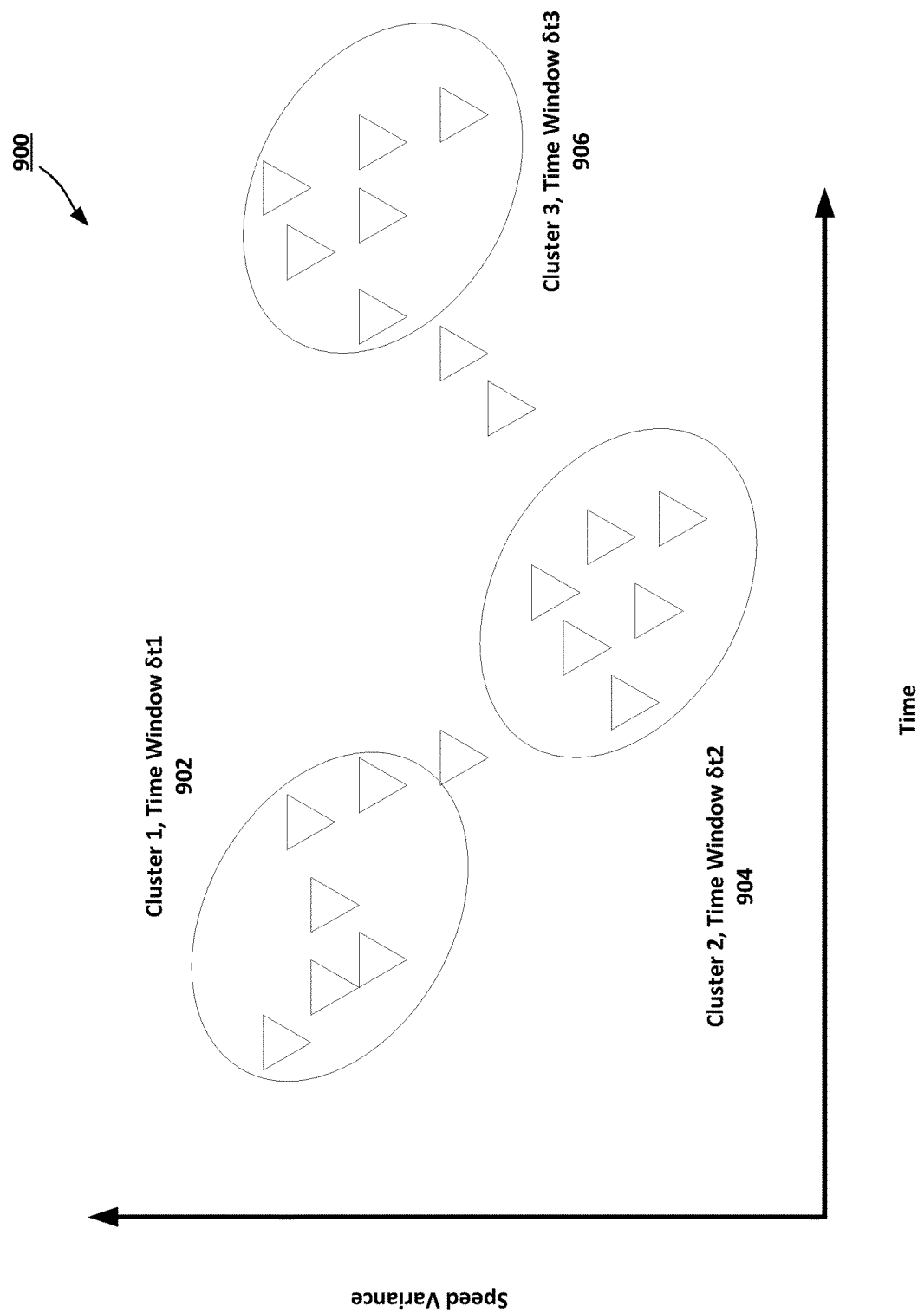
FIG. 9 is a schematic diagram of an example of neural network training for determining ADAS feature operational likelihood in accordance with embodiments of the present disclosure.

FIG. 9 is a schematic diagram 900 illustrating clustering of vehicle movement information for determining ADAS operational likelihood from telematics information in accordance with embodiments of the present disclosure. Vehicle movement information can be determined from received telematics information. Vehicle movement information can include any information that can indicate whether or how the vehicle moved during the trip. Vehicle movement information can include vehicle speed, vehicle speed variance, vehicle acceleration, vehicle braking, lateral motion, pitch and yaw, etc. Vehicle movement information can also include sound information that indicates that the vehicle changed lanes, such as sounds from road humps or lane departure warning signals.

In FIG. 9, vehicle speed variance information can be clustered. The speed variance information from the received telematics data can be analyzed over a time period, such as the trip period or a subset of the trip period. The speed variance information can be clustered based on similarities over the time period. Various clustering similarity measures can be used, such as density, centroid, distribution, average values, etc. The clusters can be compared against each other to determine whether the values within the clusters indicate the probability of an ADAS feature being operational during the time period. In FIG. 9, speed variance is clustered over time to form a first cluster 902, a second cluster 904, and a third cluster 906. The first cluster 902 and the third cluster 906 indicate relatively high speed variance for the time period. The second cluster 904 indicates a relatively low speed variance for the time period. The comparatively low speed variance observed in the second cluster 904 can indicate that an adaptive cruise control, for example, as active during that time (since comparatively low speed variance within a time window can indicate the use of adaptive cruise control). Other information can further inform the probability, such as the speed during that time window. Higher speeds with lower speed variations can further indicate the use of adaptive cruise control.

Figure 10:
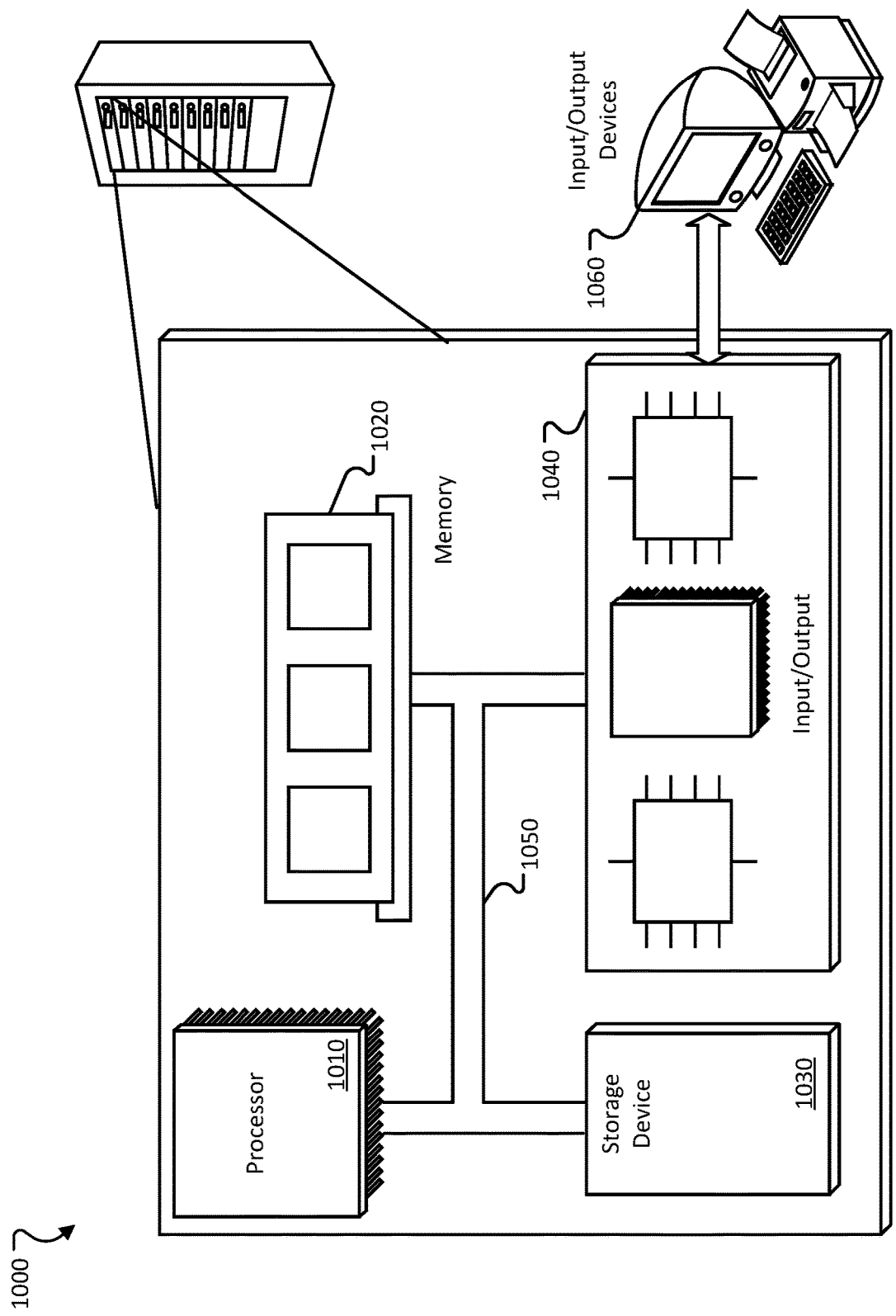
FIG. 10 is a block diagram of an example computer system in accordance with embodiments of the present disclosure.

FIG. 10 is a block diagram of an example computer system 1000 in accordance with embodiments of the present disclosure. For example, referring to FIG. 1, the mobile device 108, tag device 112, and data processing system 102 could be an example of the system 1000 described here, as could a computer system used by any of the users who access resources of these components. The system 1000 includes a processor 1010, a memory 1020, a storage device 1030, and one or more input/output interface devices 1040. Each of the components 1010, 1020, 1030, and 1040 can be interconnected, for example, using a system bus 1050.

The processor 1010 is capable of processing instructions for execution within the system 1000. The term "execution" as used here refers to a technique in which program code causes a processor to carry out one or more processor instructions. In some implementations, the processor 1010 is a single-threaded processor. In some implementations, the processor 1010 is a multi-threaded processor. The processor 1010 is capable of processing instructions stored in the memory 1020 or on the storage device 1030. The processor 1010 may execute operations such as those described with reference to other figures described herein.

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a non-transitory computer-readable medium. In various different implementations, the storage device 1030 can include, for example, a hard disk device, an optical disk device, a solid-state drive, a flash drive, magnetic tape, or some other large capacity storage device. In some implementations, the storage device 1030 may be a cloud storage device, e.g., a logical storage device including one or more physical storage devices distributed on a network and accessed using a network. In some examples, the storage device may store long-term data. The input/output interface devices 1040 provide input/output operations for the system 1000. In some implementations, the input/output interface devices 1040 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 1000 to communicate, for example, transmit and receive data. In some implementations, the input/output device can include driver devices configured to receive input data and send output data to other input/output devices, e.g., keyboard, printer and display devices 1060. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 1000 is contained within a single integrated circuit package. A system 1000 of this kind, in which both a processor 1010 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 1040.

Although an example processing system has been described in FIG. 10, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, RD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method comprising:
    receiving, by a hardware processor, telematics information produced by one or more sensors of a device during a trip in a vehicle, wherein the device is not electrically connected to the vehicle;
    processing, by the hardware processor, the received telematics information to identify a road segment traversed by the vehicle during the trip, the road segment comprising a turn;
    determining, by the hardware processor, a first point at which the vehicle begins the turn of the road segment based on one or more gyroscopic measurements included in the telematics information;
    determining, by the hardware processor, a second point at which the vehicle begins braking on the road segment based on one or more acceleration measurements included in the telematics information;
    determining, by the hardware processor, a probability that an advanced driver assistance system (ADAS) feature of the vehicle was operational during the trip based, at least in part, on the first point at which the vehicle begins turning on the road segment and the second point at which the vehicle begins braking on the road segment, wherein the probability that the ADAS feature of the vehicle was operational is higher when the second point precedes the first point; and
    determining, by the hardware processor, a risk score for the vehicle or a driver of the vehicle based, at least in part, on the probability that the ADAS feature was operational.

2. The computer-implemented method of claim 1, wherein:
    processing the received telematics information comprises comparing the received telematics information against known benchmarks; and
    determining a probability that an ADAS feature of the vehicle is operational during the trip comprises determining that the comparison of the received telematics information against the known benchmarks indicates that the ADAS feature is operational.

3. The computer-implemented method of claim 2, wherein the known benchmarks comprise values for one or more telematics information that correlate to observed telematics information when a corresponding ADAS of the vehicle is known to be operational.

4. The computer-implemented method of claim 2 comprising:
    determining the driver of the vehicle based, at least in part on, identification information of an application running on a mobile device within the vehicle;
    identifying driving metrics of the driver; and
    using the driving metrics of the driver in the comparison of the telematics information against the benchmarks.

5. The computer-implemented method of claim 4 comprising using the driving metrics of the driver, at least in part, to determine the benchmarks.

6. The computer-implemented method of claim 4 comprising:
determining, from the application running on the mobile device, a make and model of the vehicle; and
determining that the make and model of the vehicle includes the ADAS.

7. The computer-implemented method of claim 1, further comprising:
defining a first time window and a second time window for sampling the telematics information;
grouping a first subset of the received telematics information into a first cluster for the first time window, the first cluster comprising sampled values of the received telematics information comprising a first average value;
grouping a second subset of the received telematics information into a second cluster for the second time window, the second cluster comprising sampled values of the received telematics information comprising a second average value; and
determining a probability that an ADAS feature of the vehicle was operational during the first time window based on a comparison of the first cluster with the second cluster.

8. The computer-implemented method of claim 1, wherein the telematics information comprises information about speed of the vehicle; and wherein determining that an ADAS of the vehicle is likely to be operational comprises:
determining that an adaptive cruise control of the vehicle is likely to be operational based on the information about the speed of the vehicle.

9. The computer-implemented method of claim 8 comprising:
calculating a variance in speed of the vehicle within a predetermined amount of time;
determining that the variance in speed of the vehicle within the predetermined amount of time is below a threshold variance value S; and
determining that the adaptive cruise control is likely to be operational based, at least in part, on a variance in speed of the vehicle during a predetermined time duration being below the threshold variance value S.

10. The computer-implemented method of claim 8 comprising:
calculating a maximum speed of the vehicle within a predetermined window of time;
calculating a minimum speed of the vehicle within the predetermined window of time;
for a predetermined number of windows of time, determining a difference in the maximum speed for all windows and the minimum speed for all windows;
determining that the difference between minimum speed and maximum speed for all windows is less than a threshold variance value D;
determining a variance of the maximum speed for each window; and
determining that the adaptive cruise control is likely to be operational based, at least in part, on a variance in maximum speed being below the threshold variance value D.

11. The computer-implemented method of claim 10 comprising:
determining, from the speed information, that the vehicle accelerated A to a maximum speed in T seconds; and
determining that the adaptive cruise control is likely to be operational based, at least in part, on A being greater than a threshold acceleration value and T being within a threshold time value.

12. The computer implemented method of claim 8, wherein the telematics information comprises information about position of the vehicle from one or both of map matching and global position satellite (GPS) information; and the method further comprising:
determining that the adaptive cruise control of the vehicle is likely to be operational based on the information about the position of the vehicle.

13. The computer-implemented method of claim 12 comprising:
determining, from one or more of the map matching or GPS information, that the vehicle was on a multi-lane road; and
determining that the adaptive cruise control of the vehicle is likely to be operational based on the vehicle being on a large road.

14. The computer-implemented method of claim 8, wherein the telematics information comprises image information about a second vehicle that was in front of the vehicle;
the method further comprising:
determining that the adaptive cruise control is likely to be operational based, at least in part, on the image information about the second vehicle.

15. The computer-implemented method of claim 14 comprising:
determining, from the image information, a relative distance for the second vehicle relative to the vehicle for a predetermined amount of time;
determining, from the determined relative distance, that a variance of the relative distance between the second vehicle and the vehicle was below a threshold variance value for the predetermined amount of time; and
determining that the adaptive cruise control is likely to be operational based, at least in part, on the variance of the relative distance between the second vehicle and the vehicle being below a threshold variance value.

16. The computer-implemented method of claim 1 comprising:
determining that an adaptive cruise control of the vehicle is likely to be operational based at least in part on the second point at which the vehicle begins braking preceding the first point at which the vehicle begins turning by less than a predetermined threshold amount of time T.

17. The computer implemented method of claim 16, wherein determining the first point at which the vehicle begins the turn of the road segment comprises determining the first point at which the vehicle begins the turn of the road segment based on one or more of a map matching, a global positioning system (GPS) position data, and the one or more gyroscopic measurements.

18. A system comprising:
a device comprising a plurality of sensors;
a hardware processor to execute instructions; and
a memory comprising non-transient computer-readable storage media storing instructions that, when executed, cause the hardware processor to execute operations comprising:
receiving, by the hardware processor, telematics information produced by one or more sensors of a device during a trip in a vehicle, wherein the device is not electrically connected to the vehicle;

processing, by the hardware processor, the received telematics information to identify a road segment traversed by the vehicle during the trip, the road segment comprising a turn;

determining, by the hardware processor, a first point at which the vehicle begins the turn of the road segment based on one or more gyroscopic measurements included in the telematics information;

determining, by the hardware processor, a second point at which the vehicle begins braking on the road segment based on one or more acceleration measurements included in the telematics information;

determining, by the hardware processor, a probability that an advanced driver assistance system (ADAS) feature of the vehicle was operational during the trip based, at least in part, on the first point at which the vehicle begins turning on the road segment and the second point at which the vehicle begins braking on the road segment, wherein the probability that the ADAS feature of the vehicle was operational is higher when the second point precedes the first point; and determining, by the hardware processor, a risk score for the vehicle or a driver of the vehicle based, at least in part, on the probability that the ADAS feature was operational.

19. The system of claim 18, wherein:

processing the received telematics information comprises comparing the received telematics information against known benchmarks; and determining a probability that an ADAS feature of the vehicle is operational during the trip comprises determining that the comparison of the received telematics information against the known benchmarks indicates that the ADAS feature is operational.

20. The system of claim 19, wherein the known benchmarks comprise values for one or more telematics information that correlate to observed telematics information when a corresponding ADAS of the vehicle is known to be operational.

21. The system of claim 18, the operations comprising:

defining a first time window and a second time window for sampling the telematics information;

grouping a first subset of the received telematics information into a first cluster for the first time window, the first cluster comprising sampled values of the received telematics information comprising a first average value;

grouping a second subset of the received telematics information into a second cluster for the second time window, the second cluster comprising sampled values of the received telematics information comprising a second average value; and determining a probability that an ADAS feature of the vehicle was operational during the first time window based on a comparison of the first cluster with the second cluster.

22. The system of claim 18, wherein the device comprises one of a smartphone or a sensor-equipped tag.

* * * * *